United States Patent [19]
Conway

[11] Patent Number: 5,661,605
[45] Date of Patent: Aug. 26, 1997

[54] COMPUTER KEYBOARD

[76] Inventor: Kevin M. Conway, 130 Walnut Ct., Santa Rosa, Calif. 95404

[21] Appl. No.: 398,916

[22] Filed: Mar. 6, 1995

Related U.S. Application Data

[60] Division of Ser. No. 151,509, Nov. 12, 1993, Pat. No. 5,410,333, which is a continuation-in-part of Ser. No. 905,019, Jun. 26, 1992, abandoned.

[51] Int. Cl.[6] .................................. G06F 1/16; H05K 5/00
[52] U.S. Cl. ..................... 361/680; 248/918; 400/682
[58] Field of Search ............................. 361/679, 680; 364/708.1; 348/118, 118.1, 118.3, 118.5, 918; 400/82, 682, 715; G06F 1/16

[56] References Cited

U.S. PATENT DOCUMENTS

| | | | |
|---|---|---|---|
| 3,990,565 | 11/1976 | Felton et al. | 400/682 |
| 4,661,005 | 4/1987 | Lahr | 400/682 |
| 5,073,050 | 12/1991 | Andrews | 400/82 |
| 5,215,282 | 6/1993 | Bonutti | 248/118 |
| 5,377,598 | 1/1995 | Kirchner et al. | 248/918 |
| 5,405,109 | 4/1995 | Nordnes | 248/118.3 |

OTHER PUBLICATIONS

Publication—Workplace Designs, Inc.
Publication—Berkeley News Briefs.

*Primary Examiner*—Leo P. Picard
*Assistant Examiner*—Lynn D. Feild
*Attorney, Agent, or Firm*—Larry D. Johnson

[57] ABSTRACT

An ergonomic computer keyboard includes two keyboard portions, hinges connected to the respective keyboard portions enabling relative positional adjustment, carriers connected to the respective hinges, a track for supporting the carriers and enabling lateral positional adjustment of the respective carriers independently and relative to each other, and a clamp for releasably securing the track to a working surface, thereby permitting operation and positional adjustability of the keyboard portions off the working surface.

5 Claims, 3 Drawing Sheets

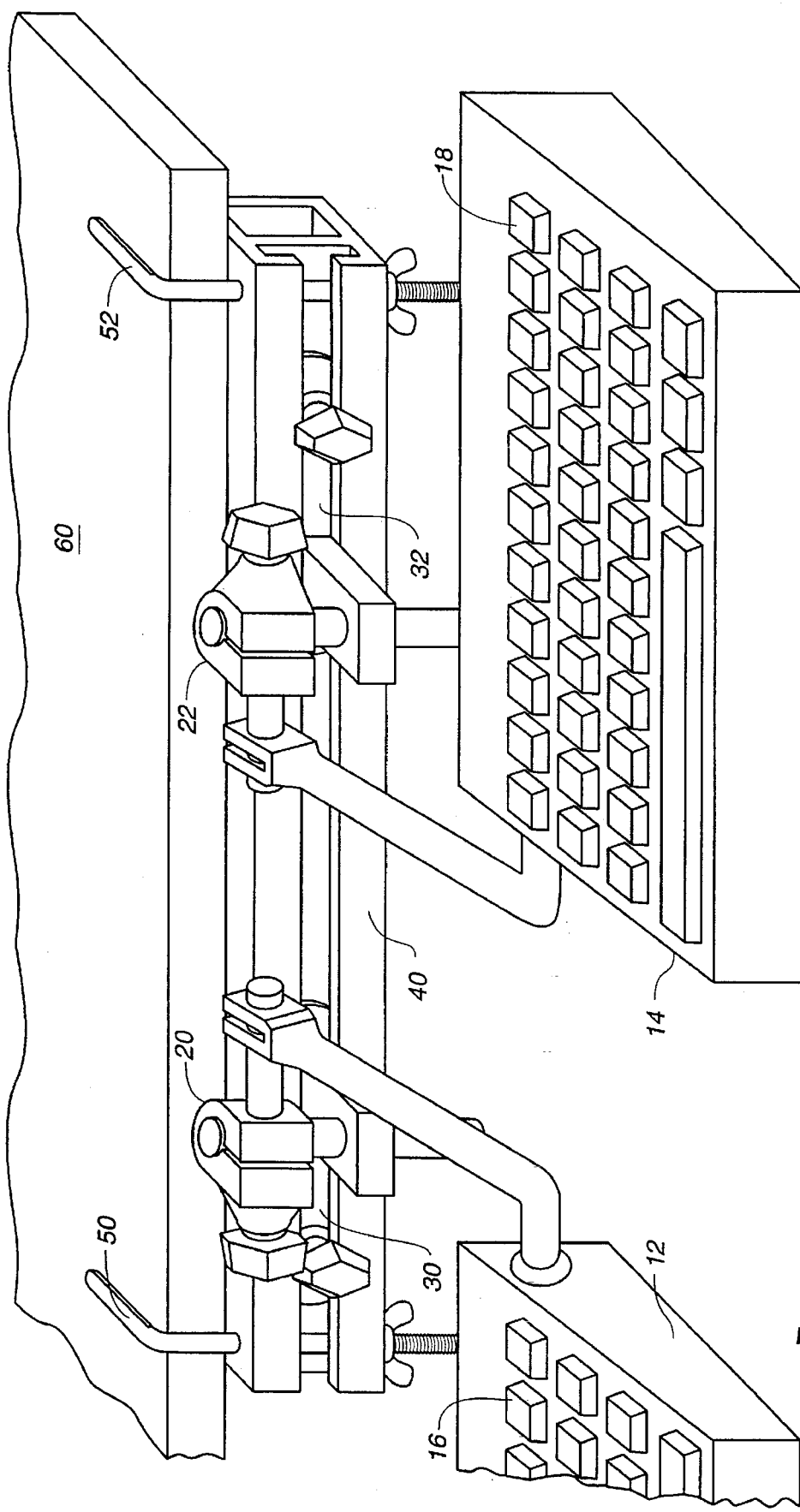
FIG._1

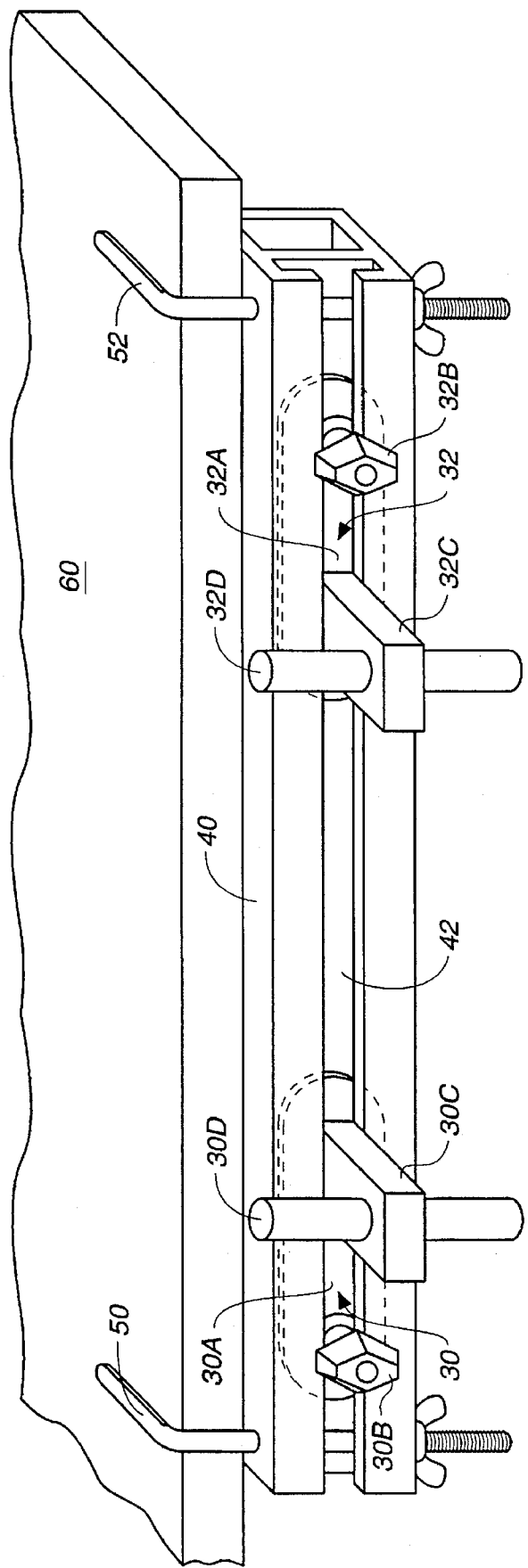

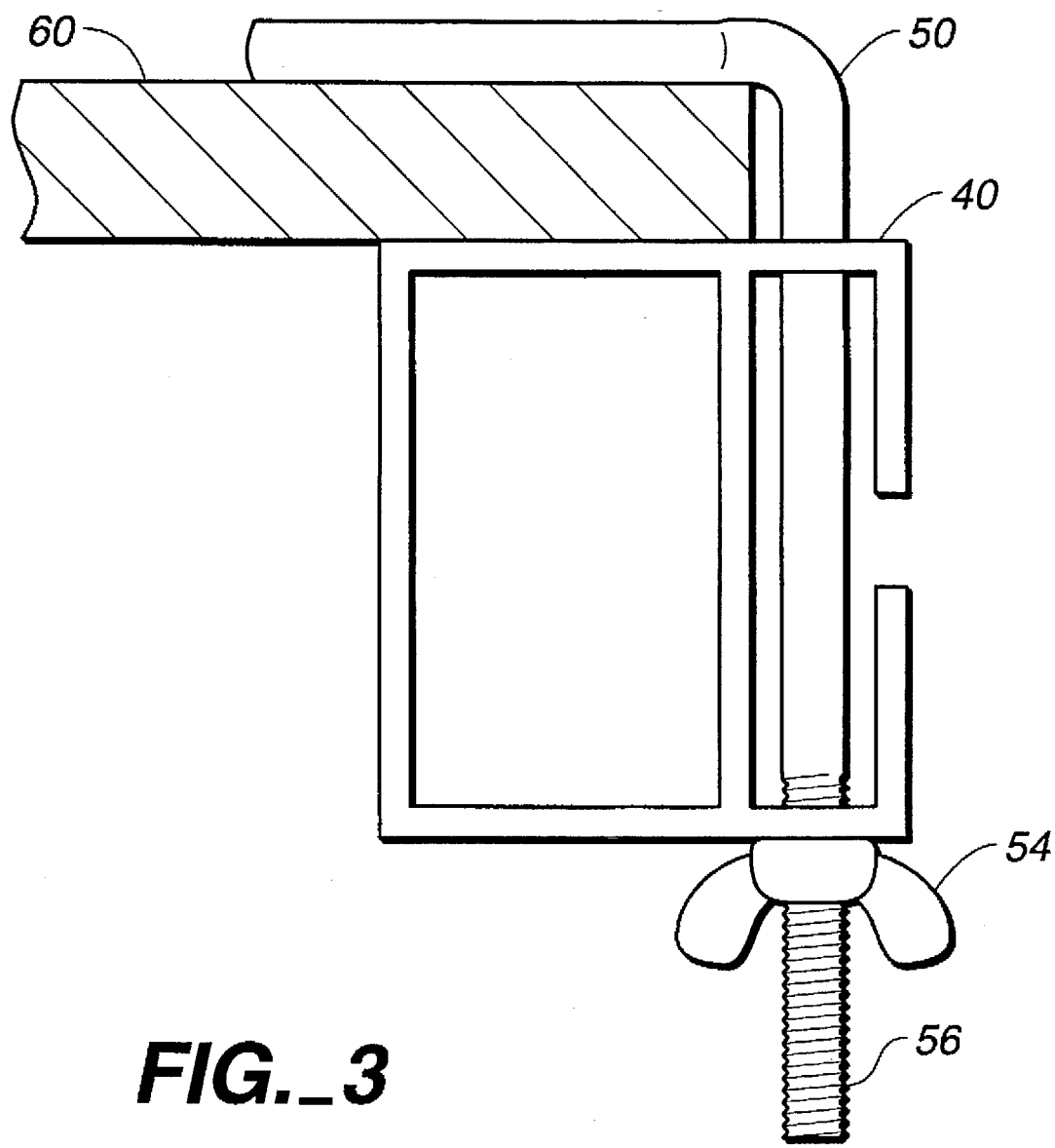
FIG._3

COMPUTER KEYBOARD

This Application is a continuation-in-part of application Ser. No. 08/151,509 filed Nov. 12, 1993 now U.S. Pat. No. 5,410,333, which is a continuation-in-part of application Ser. No. 07/905,019, filed Jun. 26, 1992, now abandoned.

BACKGROUND OF THE INVENTION

1. Field of the Invention

This invention relates generally to computer keyboards, and more specifically to an ergonomic computer keyboard structure which is positionable for operation between a user's fingers and thumb and which is supportable for operation off of a working surface.

2. Description of the Prior Art

In spite of the recent release of several "ergonomic" computer keyboards on the market, repetitive stress injuries (RSI) continue to present a serious problem for computer operators. Prior "ergonomic" designs commonly include a split keyboard on either a flat sloped or hollowed "slab". The individual sections of these keyboards are typically not adjustable. These designs attempt to place the wrists and forearms of the computer operator in a more neutral and therefore safer position. However, no position can be called "ergonomic" if that same position is held for long periods. The static loading that occurs on the joints and soft tissues with prolonged positioning (even neutral positioning) restricts circulation and presents a risk for RSI.

Those "ergonomic" keyboards that do allow for adjustable positioning of the keyboard sections are all supported on top of the working surface (e.g., a tabletop). Thus, the adjusting mechanisms must be incorporated into the support base of the keyboard. This mechanical limitation has made adjusting these keyboards a clumsy and time consuming operation. Given the general inconvenience in repositioning prior computer keyboard sections, computer keyboard operators commonly operate keyboards without regularly changing either the keyboard position or their body position or posture. Long term use of these prior keyboards causes static loading of joints and muscles and puts the operator at risk for developing RSI. It is, therefore, desirable to have a computer keyboard which can be easily positioned in numerous positions and which, in turn, enables a computer keyboard operator to readily assume a variety of body positions while operating the computer keyboard (e.g., upright sitting, sitting cross-legged, reclined sitting, kneel/sitting, or standing upright).

SUMMARY OF THE INVENTION

There is provided in accordance with the present invention an improved ergonomic computer keyboard. More particularly, the computer keyboard of the present invention includes at least two keyboard portions, hinge means connected to the respective keyboard portions and enabling positional adjustment of the keyboard portions with respect to each other, carrier means connected to the respective hinge means, track means for supporting the carrier means and enabling lateral positional adjustment of the respective carriers independently and relative to each other, and clamp means for releasably securing the track means to a working surface, thereby permitting operation and positional adjustability of the keyboard portions off of the working surface.

The positionally adjustable computer keyboard of the present invention is mountable on a track and is thus operated off of a working surface, i.e., "off the table". Such off the table operation of the computer keyboard combined with the relative positional adjustability of the keyboard portions enables the computer keyboard operator to position the computer keyboard portions with respect to each other in an infinite variety of configurations and from various vertical heights. Thus, the computer keyboard operator can regularly assume numerous different body positions (e.g., upright sitting, reclined sitting, kneel/sitting, or standing) and can adjust the computer keyboard to be comfortably operated from each body position. Additionally, because the computer keyboard portions can be arranged in a multitude of positions relative to each other, the position of the keyboard operator's forearms and wrists can change frequently and easily. Such periodic changes of both body position and forearm/wrist position enables the computer keyboard operator to eliminate the problems associated with prolonged, static body posturing and prolonged, awkward wrist/forearm positioning, thus reducing the risk of RSI.

Additionally, because the computer keyboard portions can be arranged in a multitude of positions relative to each other, the computer keyboard is particularly suitable for use by a disabled computer keyboard operator. For example, a computer keyboard operator who has only partial use of (or no use of) one upper extremity (and who might have great difficulty in operating prior keyboards) can position the computer keyboard portions of the present invention to enable comfortable operation of the keyboard keys.

The computer keyboard portions of the present invention may be positioned so that the keyboard keys may not be in plain view to the computer keyboard operator. To enable a computer keyboard operator to more readily identify specific keys, some of the keyboard keys may be differentiated by texture, contour, shape, or other features.

The computer keyboard of the present invention may be used as a stand alone, replacement keyboard. Alternatively, the computer keyboard of the present invention may be used in parallel with an existing keyboard. Such parallel use may require the addition of a keyboard interface.

In one aspect of the present invention, the computer keyboard utilizes a standard "QWERTY" keyboard key arrangement with the right-hand QWERTY keys disposed on one of the surfaces of one keyboard portion and the left-hand QWERTY keys disposed on one of the surfaces of the other keyboard portion. Non-QWERTY keys may also be disposed on the surfaces having QWERTY keys, as well as on the other surfaces of the keyboard portions. A third keyboard portion, such as a number pad, may be separately supported.

In another aspect of the present invention, the means for connecting the computer keyboard portions includes two stackable hinges, each of which is coupled to a keyboard portion for positional adjustment of that keyboard portion with respect to the other keyboard portion.

The above and other objects and advantages and novel features of the present invention will become apparent from the following detailed description of the invention illustrated in the accompanying drawings.

BRIEF DESCRIPTION OF THE DRAWINGS

FIG. 1 is a perspective view of a computer keyboard of this invention in operation and illustrating its component parts including a pair of keyboard portions, a pair of hinges connected to the respective keyboard portions and enabling positional adjustment of the keyboard portions with respect to each other, a pair of carriers connected to the respective hinges, a track for supporting the carriers and enabling lateral positional adjustment of the respective carriers independently and relative to each other, and a pair of clamps for releasably securing the track to a working surface, thereby permitting operation and positional adjustability of the keyboard portions off of the working surface;

FIG. 2 is a perspective view of a pair of carriers (with their corresponding hinges and keyboard portions removed) supported in the channel of the track member, with the track secured to the working surface by a pair of clamps; and FIG. 3 is a side elevation view of the track secured to the working surface by one of the clamps.

DETAILED DESCRIPTION OF A PREFERRED EMBODIMENT

FIG. 1 is a perspective view of a computer keyboard 10 of this invention in operation and illustrating its component parts including a pair of keyboard portions 12, 14, each bearing a plurality of computer keys, such as the left-hand QWERTY keys 16 disposed on one of the surfaces of keyboard portion 12, and the right-hand QWERTY keys 18 disposed on one of the surfaces of the other keyboard portion 14. A pair of stackable hinges 20, 22 each connects to one of the respective keyboard portions 12, 14 and enables positional adjustment of the keyboard portions with respect to each other, in the manner described in copending application Ser. No. 08/151,509. Alternatively, ball and socket hinges, or any other type of hinges that permit the desired movement, may be utilized. A pair of hinge carriers 30, 32 connects to the respective hinges 20, 22. A track member 40 supports the hinge carriers 30, 32 and enables lateral positional adjustment of the respective carriers independently and relative to each other. A pair of clamps 50, 52 releasably secures the track member 40 to a working surface such as a tabletop 60, thereby permitting operation and positional adjustability of the keyboard portions 12, 14 off of, and in front of, the working surface 60.

FIG. 2 is a perspective view of a pair of hinge carriers 30, 32 (with their corresponding hinges and keyboard portions removed) supported in the channel 42 of the track member 40. Each carrier preferably includes a body portion 30a, 32a that rides within the channel 42 and which can be releasably secured in a given lateral position by tightening of fixing knobs 30b, 32b. Arm 30c, 32c extends from the body portion 30a, 32a and terminates in support post 30d, 32d which connects to the corresponding hinge 20, 22 (FIG. 1) and enables height adjustment of the hinge relative to the working surface. The track 40 is secured to the working surface 60 by the pair of clamps 50, 52.

FIG. 3 is a side elevation view of the track 40 secured to the working surface 60 by one of the clamps 50. This view illustrates a preferred embodiment of the track and clamp arrangement, which enables selective positioning (and/or complete removal) of the track 40 from the working surface by loosening of wing nut 54 on threaded shaft 56.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and equivalents.

What is claimed as invention is:

1. An improved ergonomic computer keyboard comprising:

a pair of keyboard portions;

hinge means for enabling positional adjustment of the keyboard portions said hinge means connected to each of the respective keyboard portions;

carrier means for carrying the hinge means said carrier means connected to each of the respective hinge means, each carrier means including a support post connected to and enabling height adjustment of the respective hinge means;

track means for supporting the carrier means and enabling lateral positional adjustment of the respective carriers independently and relative to each other; and clamp means for releasably securing said track means to a working surface, thereby permitting operation and positional adjustability of said keyboard portions off of and in front of the working surface.

2. The ergonomic computer keyboard of claim 1 wherein said keyboard portions each bear some portion of a standard QWERTY keyboard key arrangement.

3. The ergonomic computer keyboard of claim 1 wherein said hinge means comprise two-part hinges.

4. The ergonomic computer keyboard of claim 1 wherein said carrier means includes a body portion adapted to ride within said track means, and which can be releasably secured in a given lateral position by tightening of a fixing knob.

5. The ergonomic computer keyboard of claim 1 wherein said clamp means comprises a pair of clamps each including a wing nut and a threaded shaft.

* * * * *